(12) United States Patent
Bruce

(10) Patent No.: US 9,903,378 B2
(45) Date of Patent: Feb. 27, 2018

(54) METHOD OF OPERATING A PUMPING SYSTEM

(71) Applicant: Edwards Limited, Crawley, West Sussex (GB)

(72) Inventor: Simon Harold Bruce, East Grinstead (GB)

(73) Assignee: Edwards Limited, Burgess Hill (GB)

( * ) Notice: Subject to any disclaimer, the term of this patent is extended or adjusted under 35 U.S.C. 154(b) by 394 days.

(21) Appl. No.: 14/569,170

(22) Filed: Dec. 12, 2014

(65) Prior Publication Data

US 2015/0125312 A1 May 7, 2015

Related U.S. Application Data

(63) Continuation of application No. 11/883,616, filed as application No. PCT/GB2006/000221 on Jan. 23, 2006, now Pat. No. 9,062,684.

(30) Foreign Application Priority Data

Feb. 2, 2005 (GB) .................................. 0502149.8

(51) Int. Cl.
  *F04D 27/00* (2006.01)
  *F04B 49/20* (2006.01)
  *F04B 49/06* (2006.01)
  *F04C 23/02* (2006.01)
  *F04C 25/02* (2006.01)
  (Continued)

(52) U.S. Cl.
  CPC ............... *F04D 27/00* (2013.01); *F04B 49/06* (2013.01); *F04B 49/20* (2013.01); *F04C 23/02* (2013.01); *F04C 25/02* (2013.01); *F04C 28/06* (2013.01); *F04D 27/004* (2013.01); *F04B 2203/0201* (2013.01); *F04B 2203/0204* (2013.01); *F04C 18/12* (2013.01); *F04C 18/16* (2013.01); *F04C 2220/10* (2013.01); *F04C 2220/12* (2013.01); *F04C 2240/403* (2013.01);
  (Continued)

(58) Field of Classification Search
  CPC ............................... F04B 49/06; F04B 49/065
  See application file for complete search history.

(56) References Cited

U.S. PATENT DOCUMENTS 5,618,167 A 4/1997 Hirakawa et al.
5,624,239 A 4/1997 Osika
(Continued)

FOREIGN PATENT DOCUMENTS

DE 10113251 A1 10/2002
EP 0574623 A1 12/1993
(Continued)

OTHER PUBLICATIONS

Prosecution History from U.S. Pat. No. 8,753,095, dated Oct. 29, 2007, through Feb. 3, 2014, 203 pp.
(Continued)

*Primary Examiner* — Patrick Hamo
(74) *Attorney, Agent, or Firm* — Shumaker & Sieffert, P.A.

(57) ABSTRACT

A pumping system for evacuating an enclosure comprises a pumping mechanism (30), a motor (32) for driving the pumping mechanism, and a controller (36) for controlling the motor. The controller sets a maximum value for a rotational frequency of the motor and a maximum value for a current in the motor, and, to optimise the performance of the pumping system, independently adjusts the maximum values during evacuation of the enclosure.

21 Claims, 4 Drawing Sheets

(51) Int. Cl.
  *F04C 28/06* (2006.01)
  *F04C 18/12* (2006.01)
  *F04C 18/16* (2006.01)
(52) U.S. Cl.
  CPC ...... *F04C 2270/08* (2013.01); *F04C 2270/09* (2013.01); *F04C 2270/18* (2013.01); *F04C 2270/19* (2013.01)

(56) References Cited

U.S. PATENT DOCUMENTS

| | | |
|---|---|---|
| 5,655,839 A | 8/1997 | Schmidt et al. |
| 5,746,581 A | 5/1998 | Okumura et al. |
| 5,879,139 A | 3/1999 | Hayashi et al. |
| 5,944,049 A | 8/1999 | Beyer et al. |
| 6,056,510 A | 5/2000 | Miura et al. |
| 6,123,522 A | 9/2000 | Kubo et al. |
| 6,178,659 B1 | 1/2001 | Corner et al. |
| 6,244,825 B1 | 6/2001 | Sasaki et al. |
| 6,257,001 B1 | 7/2001 | Muldowney et al. |
| 6,416,290 B1 | 7/2002 | Yamauchi |
| 6,416,291 B1 | 7/2002 | Butterfield et al. |
| 6,629,824 B2 | 10/2003 | Yamauchi |
| 6,695,589 B1 | 2/2004 | Dougan et al. |
| 6,739,840 B2 | 5/2004 | Curry et al. |
| 6,851,848 B2 | 2/2005 | Miwata et al. |
| 6,910,850 B2 | 6/2005 | Nonaka et al. |
| 6,966,967 B2 | 11/2005 | Curry et al. |
| 7,143,016 B1 | 11/2006 | Discenzo et al. |
| 7,564,670 B2 | 7/2009 | Kozaki et al. |
| 8,753,095 B2 | 6/2014 | Bruce |
| 2003/0219342 A1 | 11/2003 | Curry et al. |
| 2004/0064212 A1 | 4/2004 | Samata et al. |
| 2004/0081560 A1 | 4/2004 | Blumenthal et al. |
| 2005/0031468 A1 | 2/2005 | Kawaguchi et al. |
| 2005/0249618 A1 | 11/2005 | Nonaka et al. |
| 2007/0104587 A1 | 5/2007 | Kawamura et al. |
| 2007/0172376 A1 | 7/2007 | Ohmi |
| 2009/0317261 A1 | 12/2009 | Bruce |
| 2010/0047080 A1 | 2/2010 | Bruce |

FOREIGN PATENT DOCUMENTS

| | | |
|---|---|---|
| EP | 0644333 A2 | 3/1995 |
| EP | 1482178 A1 | 12/2004 |
| JP | 58063088 A | 4/1983 |
| JP | 63283492 A | 11/1988 |
| JP | 64019198 U | 1/1989 |
| JP | 11132186 A | 5/1995 |
| JP | 10266991 A | 10/1998 |
| JP | 11037087 A | 2/1999 |
| JP | 2004116319 A | 4/2004 |
| JP | 2004190583 A | 7/2004 |
| WO | 2004036049 A1 | 4/2004 |
| WO | 2005038255 A2 | 4/2005 |

OTHER PUBLICATIONS

Prosecution History from U.S. Appl. No. 11/883,616, dated Aug. 1, 2007, through Feb. 20, 2015, 182 pp.
International Search Report and Written Opinion of International Application No. PCT/GB2006/000221, dated Apr. 13, 2006.
Office Action from counterpart European Application No. 06701044.7, dated May 20, 2014, 4 pp.
English Translation of the Notification of Reason for Rejection from counterpart Japanese Patent Application No. 2007553680, dated Oct. 2, 2011, 40 pp.
English Translation of the Response to the Notification of Reason for Rejection dated Oct. 3, 2011, from counterpart Japanese Patent Application No. 2007553680, filed Apr. 3, 2012, 6 pp.
United Kingdom Search Report from counterpart Application No. GB 0502149.8, dated Apr. 22, 2005, 1 pp.

METHOD OF OPERATING A PUMPING SYSTEM

This application is a continuation of U.S. patent application Ser. No. 11/883,616, with a 35 U.S.C. § 371 date of Nov. 9, 2009. U.S. patent application Ser. No. 11/883,616 is a national stage entry under 35 U.S.C. § 371 of International Application No. PCT/GB2006/000221, filed Jan. 23, 2006, which claims the benefit of G.B. Application 0502149.8, filed Feb. 2, 2005. The entire contents of U.S. patent application Ser. No. 11/883,616, International Application No. PCT/GB2006/000221 and G.B. Application 0502149.8 are incorporated by reference herein.

FIELD OF THE INVENTION

The present invention relates to a method of operating a pumping system.

BACKGROUND OF THE INVENTION

Vacuum processing is commonly used in the manufacture of semiconductor devices and flat panel displays to deposit thin films on to substrates, and in metallurgical processes. Pumping systems used to evacuate relatively large process chambers, such as load lock chambers, to the desired pressure generally comprise at least one booster pump connected in series with at least one backing pump.

Booster pumps typically have oil-free pumping mechanisms, as any lubricants present in the pumping mechanism could cause contamination of the clean environment in which the vacuum processing is performed. Such "dry" vacuum pumps are commonly single or multi-stage positive displacement pumps employing inter-meshing rotors in the pumping mechanism. The rotors may have the same type of profile in each stage or the profile may change from stage to stage. The backing pumps may have either a similar pumping mechanism to the booster pumps, or a different pumping mechanism.

An asynchronous AC motor typically drives the pumping mechanism of a booster pump. Such motors must have a rating such that the pump is able to supply adequate compression of the pumped gas between the pump inlet and outlet, and such that the pumping speed resulting is sufficient for the duty required.

A proportion of the power supplied to the motor of the booster pump produces heat of compression in the exhaust gas, particularly at intermediate and high inlet pressure levels, such that the pump body and rotors can heat up. If the amount of compression and differential pressure generated is not adequately controlled, there may be a risk of overheating the booster pump, ultimately resulting in lubrication failure, excessive thermal expansion and seizure. The standard motor for the size and pumping speed of the booster pump is thus usually selected such that it should be able to supply adequate compression in normal use at low inlet pressures but a risk of overheating remains if the pump is operated at intermediate and high inlet pressure levels without a means of protection.

In the conventional pumping system described above, frequent and repeated operation at high to intermediate inlet pressures may be required. For example, a load lock chamber is repeatedly evacuated from atmospheric pressure to a low pressure to enable a substrate located within the chamber to be transferred to a process chamber, and subsequently exposed to atmospheric pressure to enable the processed substrate to be removed and replaced by a fresh substrate.

The amount of gas compression produced by the booster pump, and the differential pressure generated between its inlet and outlet, may be limited by various means to control the amount of heat generated and to limit the risk of overheating. If the gas compression produced by the booster pump is limited too severely, the resulting evacuation time of the large vacuum chamber may be undesirably slow. If the gas compression produced by the booster pump is not limited enough, whilst the resulting evacuation time of the vacuum chamber may be rapid the mechanical booster pump may overheat.

For driving the motor of a booster pump, a variable frequency drive unit may be provided between the motor and a power source for the motor. Such drive units operate by converting the AC power supplied by the power source into a DC power, and then converting the DC power into an AC power of desired amplitude and frequency. The power supplied to the motor is controlled by controlling the current supplied to the motor, which in turn is controlled by adjusting the frequency and/or amplitude of the voltage in the motor. The current supplied to the motor determines the amount of torque produced in the motor, and thus determines the torque available to rotate the pumping mechanism. The frequency of the power determines the speed of rotation of the pumping mechanism. By varying the frequency of the power, the booster pump can maintain a constant system pressure even under conditions where the gas load may vary substantially.

In order to prevent overloading of the booster pump, the drive unit sets a maximum value for the frequency of the power ($f_{max}$), and a maximum value for the current supplied to the motor ($I_{max}$). This current limit will conventionally be appropriate to the continuous rating of the motor, and will limit the effective torque produced by the pumping mechanism and hence the amount of differential pressure resulting, thereby limiting the amount of exhaust gas heat generated.

At the start of a rapid evacuation cycle, it is desirable to rotate the pumping mechanism as rapidly as possible to maximise the evacuation rate. Due to the high pressure, and thus relatively high density, of the gas at the start of the cycle, a large torque is required to rotate the pumping mechanism at a frequency around $f_{max}$, and so there is a high current demand, which is generally greater than $I_{max}$. To protect the motor from damage, the frequency of the power supplied to the motor of the booster pump is rapidly reduced to some level below $f_{max}$, resulting in a sharp reduction in the rotational speed of the pump while limiting the differential pressure produced. As the evacuation progresses and the inlet pressure decreases, the drive unit will ramp up the frequency towards $f_{max}$ over a finite period to gradually increase the rotational speed of the booster pump. While this protects the booster pump from overheating at all inlet pressures, this period when the rotational speed is reduced may represent an undesirable extension of the time required to evacuate the chamber from atmospheric pressure to the desired low pressure (the "pump down" time).

SUMMARY OF THE INVENTION

It is an aim of at least the preferred embodiment of the present invention to seek to solve these and other problems.

In a first aspect, the present invention provides a pumping system comprising a pumping mechanism; a motor for driving the pumping mechanism; and a controller for controlling the motor, wherein the controller sets a maximum value for a rotational frequency of the motor ($f_{max}$) and a maximum value for a current in the motor ($I_{max}$), and, to optimise the performance of the pumping system, adjusts said maximum values during operation of the pumping system.

In a second aspect, the present invention provides a method of controlling a pumping system comprising a pumping mechanism and a motor for driving the pumping mechanism, the method comprising the steps of setting a maximum value for a rotational frequency of the motor and a maximum value for a current in the motor, and, during operation of the pumping system, adjusting said maximum values to optimise the performance of the pumping system.

Features described above in relation to system aspects of the invention are equally applicable to method aspects of the invention, and vice versa.

BRIEF DESCRIPTION OF DRAWINGS

Preferred features of the present invention will now be described with reference to the accompanying drawing, in which.

DETAILED DESCRIPTION

Figure 1:
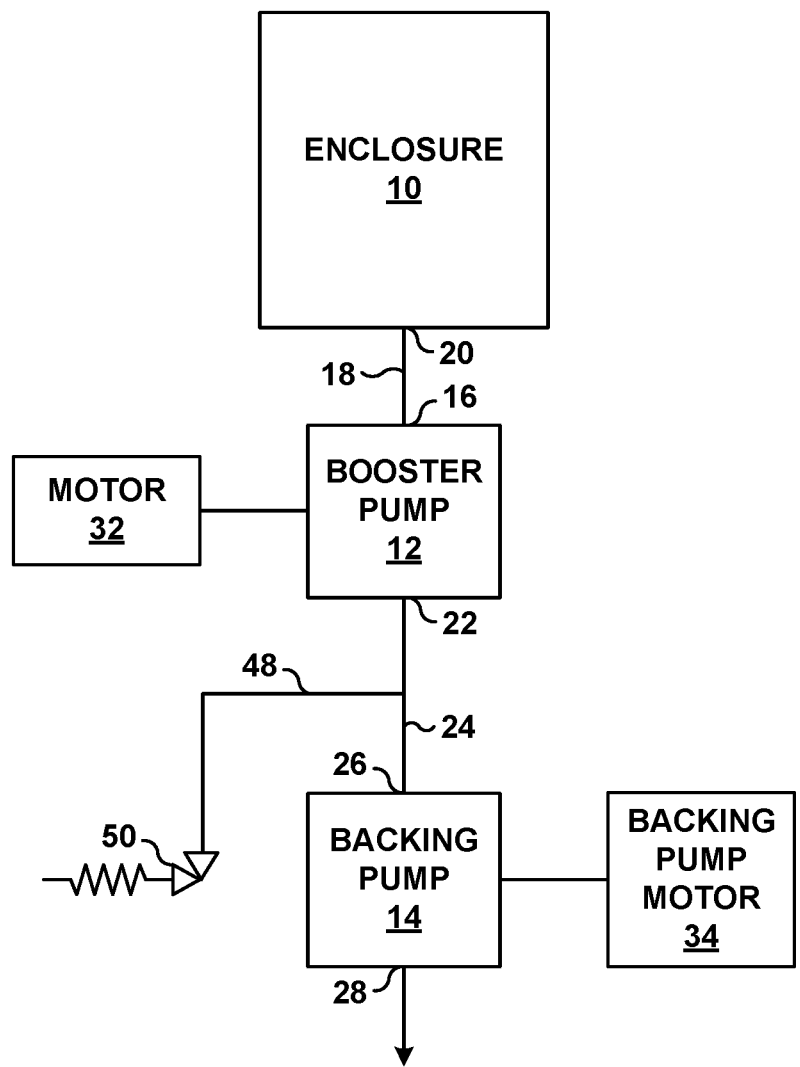
FIG. 1 illustrates schematically an example of a pumping system for evacuating an enclosure.

In a first aspect, the present invention provides a pumping system comprising a pumping mechanism: a motor for driving the pumping mechanism: and a controller for controlling the motor, wherein the controller sets a maximum value for a rotational frequency of the motor ($f_{max}$) and a maximum value for a current in the motor ($I_{max}$) and, to optimise the performance of the pumping system, adjusts said maximum values during operation of the pumping system.

The system preferably comprises an inverter for supplying a variable frequency power to the motor, the controller adjusting the amplitude and frequency of the power during operation of the pumping system.

The controller is preferably configured to receive input from at least one sensor for monitoring one or more states within the system, and to adjust at least one of the maximum values in dependence on the monitored states. For example, at least one sensor may be configured to supply a signal indicative of a gas pressure within the pumping system, the controller adjusting at least one of the maximum values in dependence on the received signal(s). In another example, at least one sensor may be configured to supply a signal indicative of a temperature of the pumping system, the controller adjusting at least one of the maximum values in dependence on the received signal(s). In yet another example, no external sensors are utilised and instead the controller adjusts at least one of the maximum values in dependence on time only, according to established system configuration and parameters.

In the preferred embodiment, both of these maximum values are varied as the gas pressure decreases during evacuation of the enclosure from atmospheric pressure. The controller is configured to increase the maximum value for the current in the motor ($I_{max}$) during operation of the pumping system at a relatively high pressure, and to increase the maximum value for the rotational frequency of the motor ($f_{max}$) during operation of the pumping system at a relatively low pressure.

In a first, relatively high pressure region, that is, where the pressure at the inlet to the pumping mechanism decreases from atmospheric pressure $I_{max}$ may be increased to such a value that, during use in this high pressure region, $I_{max}$ is greater than the nominal specification for the motor, and sufficient to allow increased differential pressure to be developed such that the booster inlet pressure attains a lower level, with its outlet venting straight to atmosphere, than would otherwise be possible with the nominal $I_{max}$.

If operated for the entire evacuation cycle with this elevated value of $I_{max}$ there is a risk that the motor may overheat. In view of this, once the pressure falls below a first predetermined value, for example, between 100 mbar and 500 mbar, the value of $I_{max}$ is decreased to allow optimum pumping performance while keeping the generated pressure differential within safe limits to prevent overheating of the pumping mechanism.

When the gas pressure reaches a second predetermined value lower than the first predetermined value, for example, between 1 mbar and 100 mbar, more preferably between 10 mbar and 100 mbar, the density of gas pumped from the enclosure will be inadequate to cause risk of overheating of the pumping mechanism, and so $f_{max}$ can be increased to improve pump performance.

As an alternative to varying the maximum values in dependence on the pressure of gas supplied to the pumping mechanism. At least one of the maximum values may by adjusted in dependence on the pressure of gas exhaust from the pumping mechanism. As further alternatives, these values may be adjusted in dependence on the body temperature of the pumping mechanism and/or on the temperature of the gas entering the pumping mechanism at its inlet port and/or on the temperature of the gas exhausting from the mechanism at its outlet port.

The pumping mechanism is preferably a pumping mechanism of a booster pump for pumping gas from the enclosure. The pumping system may also comprise a primary, or backing, pump having an inlet connected to the exhaust of the booster pump. If allowed to freely vent gas exhaust direct to atmosphere using a separate vent line which does not route through the primary pump, and with no restriction to its rotational speed, the booster pump alone at high inlet pressures can provide a higher net pumping speed than would be achievable being connected through the primary pump, from atmospheric pressure down to an inlet pressure determined by the available motor power. This can assist in achieving a more rapid evacuation of the enclosure than would otherwise result. If this vent line is terminated with a pressure relief valve, it will be open to atmosphere and freely venting whenever the pressure of gas exhaust from the booster pump is above atmospheric pressure, allowing the booster pump to operate at maximum nominal speed. Therefore, the system preferably comprises a pressure relief valve in fluid communication with an exhaust from the booster pumping mechanism for selectively releasing gas compressed by the booster pumping mechanism to the atmosphere. The pressure relief valve is preferably configured to automatically close when the pressure of gas exhaust from the booster pump falls below atmospheric pressure, at which point the primary pump becomes effective in reducing the booster pump outlet pressure further and enhancing the net pumping speed.

The closing of the pressure relief valve can provide a convenient indication of the pressure within the pumping system, and so at least one sensor may be configured to detect the position of the pressure relief valve, and the controller configured to decrease the maximum value of the current in the motor when the pressure relief valve moves from an open position to a closed position.

In a second aspect, the present invention provides a method of controlling a pumping system comprising a pumping mechanism and a motor for driving the pumping mechanism, the method comprising the steps of setting a maximum value for a rotational frequency of the motor and a maximum value for a current in the motor, and, during operation of the pumping system, adjusting said maximum values to optimise the performance of the pumping system.

Referring to FIG. 1, a vacuum pumping system is illustrated for evacuating an enclosure 10, such as a load lock chamber or other relatively large chamber. The system comprises a booster pump 12 connected in series with a backing pump 14. The booster pump 12 has an inlet 16 connected by an evacuation passage 18, preferably in the form of a conduit 18, to an outlet 20 of the enclosure 10. An exhaust 22 of the booster pump 12 is connected by a conduit 24 to an inlet 26 of the backing pump 14. The backing pump 14 has an exhaust 28 that exhausts the gas drawn from the enclosure 10 to the atmosphere.

Although the pumping system illustrated in FIG. 1 includes a single booster pump and a single backing pump, any number of booster pumps may be provided depending on the pumping requirements of the enclosure. Where a plurality of booster pumps are provided, these are connected in parallel so that each booster pump can be exposed to the same operating conditions. Where a relatively high number of booster pumps are provided, two or more backing pumps may be provided in parallel. Furthermore, an additional row or rows of booster pumps similarly connected in parallel may be provided as required between the first row of booster pumps and the backing pumps.

Figure 2:
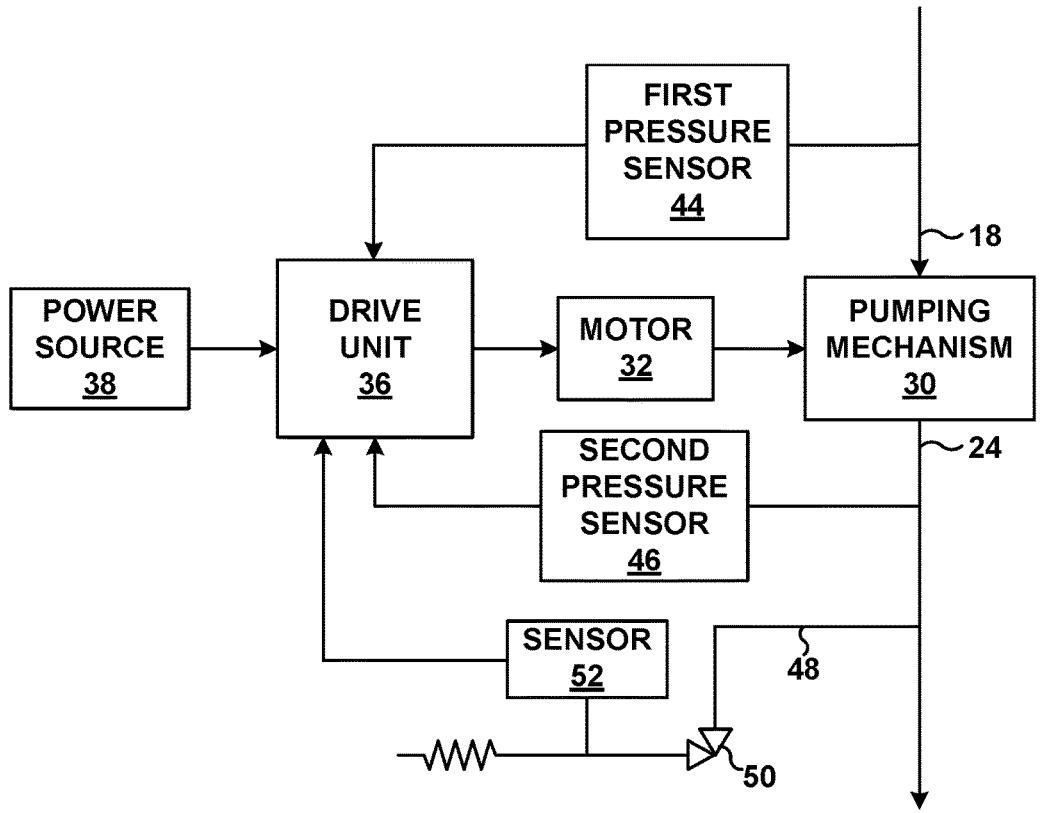
FIG. 2 illustrates schematically a first embodiment of a drive system for driving a motor of the booster pump of the pumping system of FIG. 1.

With reference also to FIG. 2, the booster pump 12 comprises a pumping mechanism 30 driven by a variable speed motor 32. Booster pumps typically include an essentially dry (or oil free) pumping mechanism 30, but generally also include some components, such as bearings and transmission gears, for driving the pumping mechanism 30 that require lubrication in order to be effective. Examples of dry pumps include Roots, Northey (or "claw") and screw pumps. Dry pumps incorporating Roots and/or Northey mechanisms are commonly multi-stage positive displacement pumps employing intermeshing rotors in each pumping chamber. The rotors are located on contra-rotating shafts, and may have the same type of profile in each chamber or the profile may change from chamber to chamber.

The backing pump 14 may have either a similar pumping mechanism to the booster pump 12, or a different pumping mechanism. For example, the backing pump 14 may be a rotary vane pump, a rotary piston pump, a Northey, or "claw", pump, or a screw pump. A backing pump motor 34 drives the pumping mechanism of the backing pump 14.

The motor 32 of the booster pump 12 may be any suitable motor for driving the pumping mechanism 30 of the booster pump 12. In the preferred embodiment, the motor 32 comprises an asynchronous AC motor. A control system for driving the motor 32 comprises a variable frequency drive unit 36 for receiving an AC power supplied by a power source 38 and converting the received AC power into a power supply for the motor 32.

Figure 3:
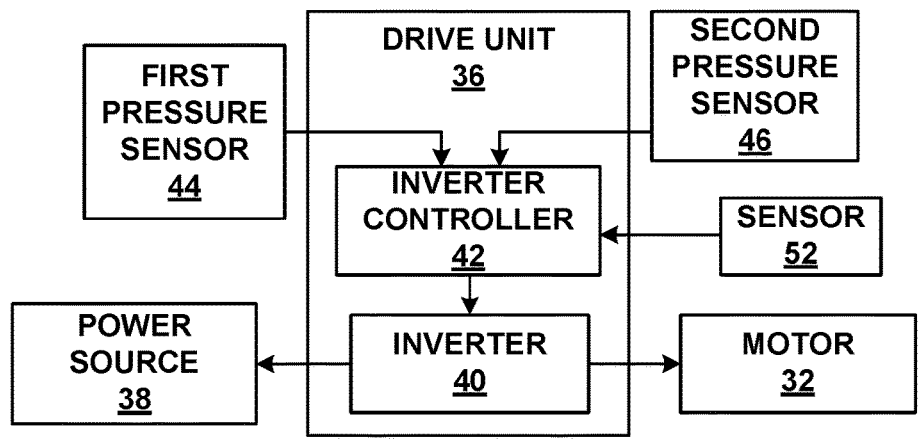
FIG. 3 illustrates in more detail the variable frequency drive unit of the drive system of FIG. 2.

FIG. 3 illustrates the drive unit 36 in more detail. The drive unit 36 comprises an inverter 40 and an inverter controller 42. As is known, the inverter 40 comprises a rectifier circuit for converting the AC power from the power source 38 to a pulsating DC power, an intermediate DC circuit for filtering the pulsating DC power to a DC power, and an inverter circuit for converting the DC power into an AC power for driving the motor 32.

The inverter controller 42 controls the operation of the inverter 40 so that the power has a desired amplitude and frequency. The inverter controller 42 adjusts the amplitude and frequency of the power in dependence on an operational state of the pumping system. In the example shown in FIGS. 2 and 3, the inverter controller 42 controls the power in dependence on a gas pressure within the pumping system. As illustrated, the inverter controller 42 receives a first signal indicative of the pressure at the inlet 16 of the booster pump 12 from a first pressure sensor 44 for detecting the pressure within the conduit 18. Alternatively, or in addition, the inverter controller 42 may receive a second signal indicative of the pressure at the exhaust 22 of the booster pump 12 from a second pressure sensor 46 for detecting the pressure within the conduit 24. The inverter controller 42 then varies the power in dependence on one, or both, of the first and second signals. When the frequency of the power output from the inverter 40 varies, the speed of rotation of the motor 32 varies in accordance with the change in frequency. The drive unit 36 is thus able to vary the speed of the booster pump 12 during the evacuation of the enclosure 10 to optimise the performance of the booster pump 12.

The inverter controller 42 sets values for two or more operational limits of the drive unit 36; in particular, the maximum frequency of the power supplied to the motor 32 ($f_{max}$), and the maximum current that can be supplied to the motor 32 ($I_{max}$). As mentioned above, the value of $I_{max}$ is normally set so that it is appropriate to the continuous rating of the motor 32, that is, the power at which the motor can be operated indefinitely without reaching an overload condition. Setting a maximum to the power supplied to the motor has the effect of limiting the effective torque available to the pumping mechanism 30. This in turn will limit the resulting differential pressure across the booster pump 12, and thus limit the amount of heat generated within the booster pump 12.

The inverter controller 42 also monitors the current supplied to the motor 32. The current supplied to the motor 32 is dependent upon the values of the frequency and amplitude of the AC power supplied to the motor 32 by the drive unit 36. In the event that the current supplied to the motor 32 exceeds $I_{max}$, the inverter controller 42 controls the inverter 40 to rapidly reduce the frequency and amplitude of the power supplied to the motor 32, thereby reducing both the current below $I_{max}$ and the speed of the booster pump 12.

Returning to FIG. 1, a branch conduit 48 is connected to the conduit 24 extending between the exhaust 22 of the booster pump 12 and the inlet 26 of the backing pump 14. The branch conduit 48 terminates in an overpressure relief valve 50. When the pressure in the conduit reaches a predetermined pressure, which, in this example is around, or slightly above, atmospheric pressure, the relief valve 50 opens to release compressed gas within the conduit 24 to the atmosphere. As illustrated in FIGS. 2 and 3, a sensor 52 may be provided for outputting a signal indicative of the position of the relief valve 50, which signal is also supplied to the inverter controller 42. The inverter controller 42 thus may receive signals from the sensors 44, 46 indicative of the pressure at the inlet 16 and at the outlet 22 of the booster pump 12 respectively, and a signal from the sensor 52 indicative of the position of the pressure relief valve 50.

A method of operating the pumping system illustrated in FIGS. 1 to 3 to evacuate the enclosure 10 from atmosphere to a desired pressure will now be described.

At high inlet pressures during the initial stage of the evacuation of the enclosure 10, the pressure of the gas exhaust from the booster pump 12 will, due to the compression of the gas by the pumping mechanism 30 of the booster pump 12, be above atmospheric pressure, and so the pressure relief valve 50 opens to allow gas exhaust from the booster pump 12 to be vented directly to the atmosphere in order to improve the net pumping speed of the pumping system.

As mentioned above, the inverter controller 42 pre-sets values for $I_{max}$ and $f_{max}$ that are appropriate to the continuous rating of the motor 32, that is, the power at which the motor can be operated indefinitely without reaching an overload condition. During this initial stage of operation of the pumping system, due to the relatively high pressure of the gas passing through the booster pump 12, a high current is required to provide sufficient torque to the motor 32 to rotate the pumping mechanism 30 at a frequency approaching $F_{max}$ and to produce substantial differential pressure across the mechanism in order to pump down to a satisfactory intermediate pressure. The optimum current for this may be generally greater than the usual value of $I_{max}$. In order to maximise the pumping capability of the booster pump 12 during this initial stage of the evacuation of the enclosure 10, the value for $I_{max}$ is temporarily increased to a value that allows the full capacity of the booster pump 12 to be utilised, that is, to a value higher than the normal rating of the motor. The booster pump is thus temporarily "overloaded" in order to prolong the increased rate of evacuation of the enclosure during this initial, high pressure stage of the evacuation of the enclosure 10, as indicated at "H" in FIG. 4, which illustrates at 53 the variation of net pumping speed, or evacuation rate, of the enclosure 10 with inlet pressure during operation of the pumping system in comparison to a similar variation, illustrated at 55, for the pumping system where $F_{max}$ and $I_{max}$ are not varied during operation. Alternatively, a motor substantially larger than that normally fitted to the booster pump and having a higher current rating may be utilised so that the temporarily increased value of $I_{max}$ does not, in fact, represent any motor overload condition.

To prevent overheating of the booster pump 12 due to prolonged operation with the elevated value of $I_{max}$, the value of $I_{max}$ is subsequently returned to the pre-set value:
    after a first predetermined time period has elapsed; or
    when a gas pressure in the pumping system has reached a first predetermined value.

This first predetermined value may be detected from a signal received from any of the sensors 44, 46, 52. For example, as indicated at 54 in FIG. 4, this overloading of the booster pump 12 may be terminated when the gas pressure at the inlet 16 of the booster pump 12, as indicated by the signal output from the sensor 44, falls below a first predetermined value, which in the illustrated example is around 200 mbar. As an alternative, the overloading of the booster pump 12 may be terminated when the gas pressure at the exhaust 22 of the booster pump 12, as indicated by the signal output from the sensor 46, falls below a first predetermined value, which in the illustrated example is around atmospheric pressure. This may be conveniently detected by the closure of the pressure relief valve 50, as input to the inverter controller 42 by the sensor 52. Any one of the signals output from these three sensors 44, 46, 52 may therefore be used as a trigger to reduce the value of $I_{max}$. The consequence of $I_{max}$ reduction at this point will typically be a reduction in the booster motor rotational speed.

Figure 4:
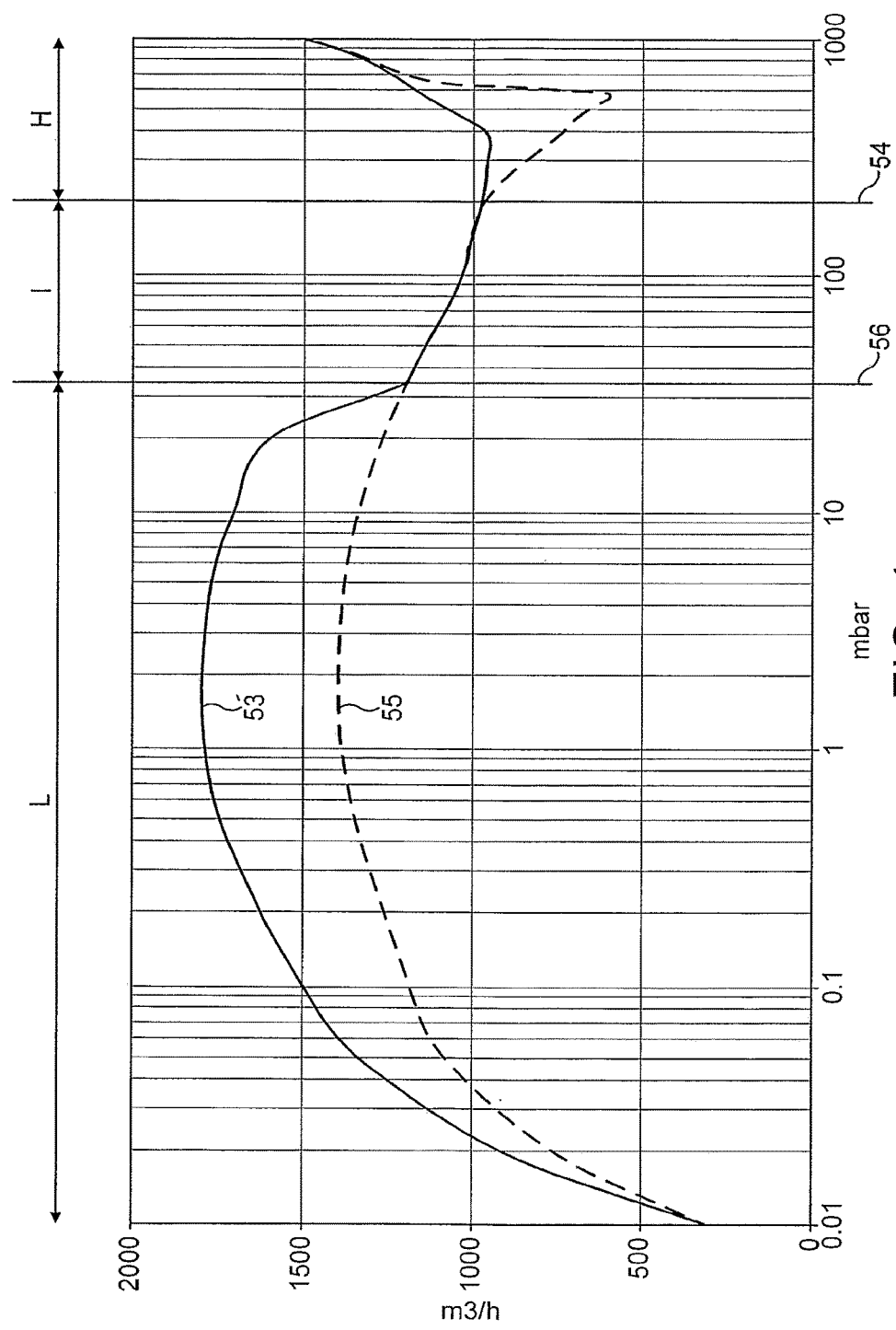
FIG. 4 is a graph illustrating the variation of the net pumping speed, or evacuation rate, of the enclosure with inlet pressure during operation of the pumping system of FIG. 1.

Reduction of the value of $I_{max}$ to the preset value during the second, intermediate pressure stage of the evacuation of the enclosure 10 (as indicated at "I" in FIG. 4), enables optimum booster pump performance during this intermediate pressure stage while maintaining the pressure differential generated by the booster pump 12 within a limit that prevents overheating of the booster pump 12. As the closure of the pressure relief valve 50 has placed the primary pump 14 in fluid communication with the booster pump 12, the primary pump 14 now becomes effective in enhancing the net pumping speed of the pumping system, which, as illustrated in FIG. 4, steadily increases as the pressure at the inlet 16 of the booster pump 12 continues to fall.

As the evacuation progresses and the pressure at the inlet 16 of the booster pump 12 decreases, the inverter controller 42 gradually increases the frequency of the power supplied to the motor 32 to maintain the current around $I_{max}$ to maximise the pumping speed. As the pressure of the gas entering the booster pump 12 decreases, the density of this gas also decreases, and so the risk of overheating of the booster pump 12 decreases as the inlet pressure decreases. In view of this, in order to maximise the performance of the booster pump 12 during the further evacuation of the enclosure 10, the inverter controller 42 increases the value of $F_{max}$ for a third, low pressure stage of the evacuation of the enclosure 10 (as indicated at "L" in FIG. 4). The increase of the value of $F_{max}$ may be triggered by:
    the expiry of a second, predetermined time period; or
    when a gas pressure in the pumping system has reached a second predetermined value lower than the first predetermined value.

This second predetermined value may be detected from a signal received from any of the sensors 44, 46. For example, as indicated at 56 in FIG. 4, the value of $F_{max}$ may be increased when the gas pressure at the inlet 16 of the booster pump 12, as indicated by the signal output from the sensor 44, falls below a second predetermined value, which in the illustrated example is around 30 mbar. As an alternative, $F_{max}$ may be increased when the gas pressure at the exhaust 22 of the booster pump 12, as indicated by the signal output from the sensor 46, falls below a second predetermined value. Clearly, where the first and second predetermined values are determined from the input from sensor 44 only, the sensors 46, 52 need not be provided. Alternatively, the relationship(s) between two, or more, pressure signals may be used to derive a suitable control signal.

The pumping system is thus able to combine the benefits of the booster pump 12 exhausting to atmosphere at high inlet pressures with increased pumping speed, while retaining control over operating temperatures at intermediate inlet pressures, and further providing enhanced pumping speed at low pressures.

Figure 5:
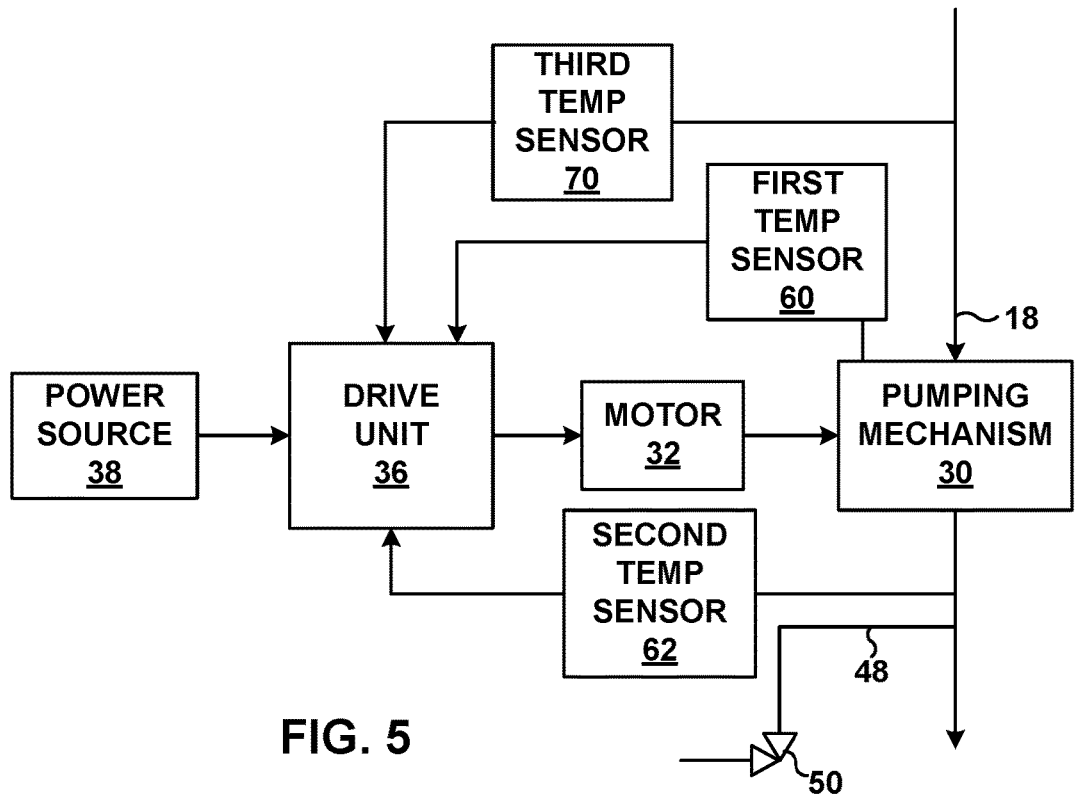
FIG. 5 illustrates schematically a second embodiment of a drive system for driving a motor of the booster pump of the pumping system of FIG. 1.
Figure 6:
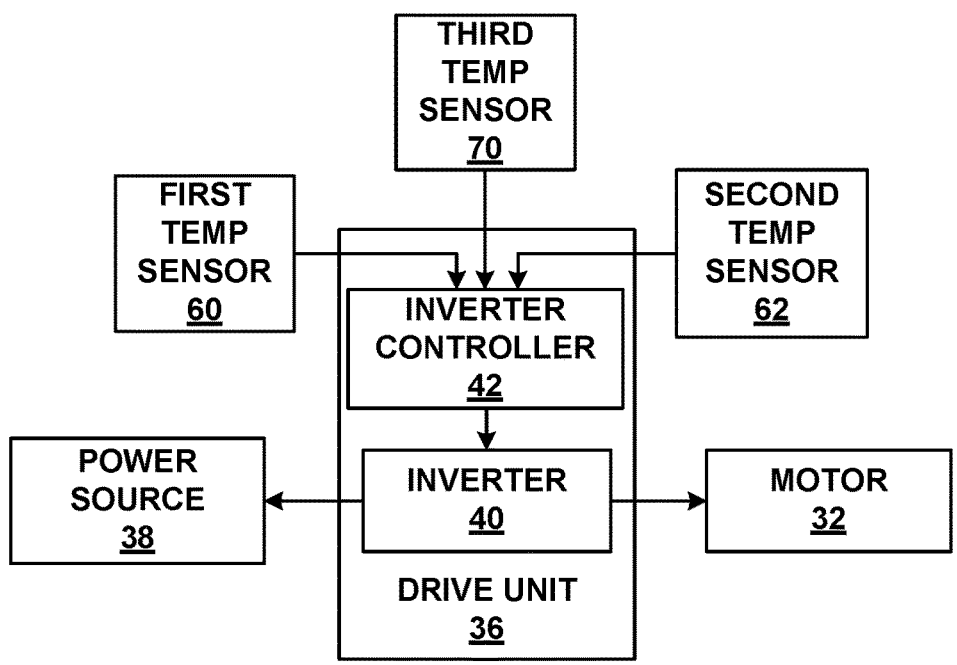
FIG. 6 illustrates in more detail the variable frequency drive unit of the drive system of FIG. 5.

An alternative technique for controlling the drive unit 36 is illustrated in FIGS. 5 and 6. This technique is similar to that described with reference to FIGS. 2 and 3, with the exception that in the example shown in FIGS. 5 and 6, the inverter controller 42 controls the power in dependence on one or more temperatures within the pumping system. As illustrated, the inverter controller 42 receives a first signal indicative of the temperature of the pumping mechanism from a first temperature sensor 60. Alternatively, or in addition, the inverter controller 42 may receive a second signal indicative of the temperature of gas exhaust from the booster pump 12 from a second temperature sensor 62 for detecting the temperature of gas within the conduit 24. Alternatively, or in addition, the inverter controller 42 may receive a third signal indicative of the temperature of gas entering the booster pump 12 from a third temperature sensor 70 for detecting the temperature of gas within the conduit 18. Alternatively, the relationship(s) between two, or more, temperature signals may be used to derive a suitable control signal. The inverter controller 42 then varies the power, and the values for $F_{max}$ and $I_{max}$, in dependence on one, or more, of the first, second and third signals. For example, when one of the temperatures reaches a first predetermined value, the value of $I_{max}$ is returned to the pre-set value, and when one of the temperatures reaches a second predetermined value different from the first value, the value of $F_{max}$ is increased.

While the foregoing description and drawings represent the preferred embodiments of the present invention, it will be apparent to those skilled in the art that various changes and modifications may be made therein without departing from the true spirit and scope of the present invention.

I claim:

1. A vacuum pumping system comprising:
   a pumping mechanism;
   a motor for driving the pumping mechanism; and
   a controller for controlling the motor, wherein the controller sets a maximum value for a rotational frequency of the motor and a maximum value for a current in the motor, wherein the controller adjusts the maximum values during operation of the vacuum pumping system, and
   wherein the controller is configured to increase the maximum value for the current in the motor from a normal continuous operation current rating of the motor to be temporarily higher than the normal continuous operation current rating of the motor during operation of the vacuum pumping system at a relatively high pressure,
   wherein the controller is configured to decrease the maximum value for the current in the motor to be no greater than the normal continuous operation current rating of the motor below the relatively high pressure, and
   wherein the controller is configured to increase the maximum value for the rotational frequency of the motor during operation of the vacuum pumping system at a relatively low pressure.

2. The vacuum pumping system of claim 1, wherein the controller is configured to receive input from at least one sensor for monitoring one or more states within the vacuum pumping system, and to adjust at least one of the maximum values in dependence on the monitored states.

3. The vacuum pumping system of claim 2,
   wherein the at least one sensor is configured to supply a signal indicative of a gas pressure within the vacuum pumping system, and
   wherein the controller is configured to adjust the at least one of the maximum values in dependence on the received signal.

4. The vacuum pumping system of claim 3, wherein the controller is configured to adjust the maximum value for the current in the motor to be lower than the normal continuous operation current rating for the motor in response to determining that the gas pressure is below a first predetermined value.

5. The vacuum pumping system of claim 4, wherein the controller is configured to increase the maximum value for the rotational frequency of the motor in response to determining that the gas pressure is below a second predetermined value, the second predetermined value being lower than the first predetermined value.

6. The vacuum pumping system of claim 3, wherein the at least one sensor comprises two sensors, and wherein the two sensors are configured to detect a pressure of a gas conveyed to the pumping mechanism and a pressure of a gas exhaust from the pumping mechanism, and the controller is configured to adjust the at least one of the maximum values in dependence on a relationship between the detected respective different pressures.

7. The vacuum pumping system of claim 2,
   wherein at least one sensor is configured to supply a signal indicative of a temperature within the vacuum pumping system, and
   wherein the controller is configured to adjust at least one of the maximum values in dependence on the signal indicative of the temperature within the vacuum pumping system.

8. The vacuum pumping system of claim 7,
   wherein the controller is configured to adjust the maximum value for the current in the motor when the temperature is above a first predetermined value, and
   wherein the controller is configured to adjust the maximum value for the rotational frequency of the motor when the temperature is above a second predetermined value, the second predetermined value being different to the first predetermined value.

9. The vacuum pumping system of claim 7, wherein the controller is configured to return the maximum value for the current in the motor to be equal to the normal continuous operation current rating of the motor when the temperature reaches the first predetermined value.

10. The vacuum pumping system of claim 7, wherein at least one sensor is configured to supply a signal indicative of one of a group consisting of:
    a temperature of gas exhaust from the pumping mechanism;
    a temperature of gas inlet to the pumping mechanism; and
    a temperature of the pumping mechanism.

11. A method of controlling a vacuum pumping system comprising a pumping mechanism and a motor for driving the pumping mechanism, the method comprising:
    setting a maximum value for a rotational frequency of the motor and a maximum value for a current in the motor;
    during operation of the vacuum pumping system at a relatively high pressure, increasing the maximum value for the current in the motor to be higher than a continuous operation current rating of the motor;
    during operation of the vacuum pumping system below the relatively high pressure, decreasing the maximum value for the current in the motor to be no greater than the continuous operation current rating of the motor; and
    during operation of the vacuum pumping system at a relatively low pressure, increasing the maximum value for the rotational frequency of the motor.

12. The method of claim 11, wherein increasing the maximum value for the current in the motor during operation of the vacuum pumping system at the relatively high pressure includes increasing the maximum value for the current in the motor from a normal continuous rating of the motor temporarily to a value higher than the normal continuous rating of the motor.

13. The method of claim 11, wherein at least one of the maximum values is adjusted in dependence on at least one gas pressure within the vacuum pumping system.

14. The method of claim 13, wherein the maximum value for the current in the motor is decreased to be lower than the continuous operation current rating for the motor in response to determining that the gas pressure falls below a first predetermined value.

15. The method of claim 14, wherein the maximum value for the rotational frequency of the motor is increased in response to determining that the gas pressure falls below a second predetermined value, the second predetermined value being lower than the first predetermined value.

16. The method of claim 13, wherein at least one gas pressure includes a pressure of a gas conveyed to the pumping mechanism.

17. The method of claim 13, wherein at least one gas pressure includes a pressure of a gas exhaust from the pumping mechanism.

18. The method of claim 11, wherein the vacuum pumping system comprises a pressure relief valve downstream from the pumping mechanism, and at least one of the maximum values is adjusted depending on the position of the pressure relief valve.

19. The method of claim 18, wherein the maximum value of the current in the motor is decreased when the pressure relief valve moves from an open position to a closed position.

20. The method of claim 11, further comprising returning the maximum value for the current in the motor to be equal to the continuous operation current rating of the motor when a temperature within the vacuum pumping system reaches a first predetermined value.

21. The method of claim 20, wherein the temperature is selected from a group consisting of:
    a temperature of gas exhaust from the pumping mechanism;
    a temperature of gas inlet to the pumping mechanism; and
    a temperature of the pumping mechanism.

* * * * *